United States Patent [19]

Dupuis et al.

[11] Patent Number: 4,495,618
[45] Date of Patent: Jan. 22, 1985

[54] DIGITAL SWITCHING NETWORK

[75] Inventors: Bernard Dupuis, Montigny le Bretonneux; Jean-Pierre Pasquet, Villejuif; Christian Coppens, Velizy, all of France

[73] Assignee: Campagnie Industrielle des Communications Cit-Alcatel, Paris, France

[21] Appl. No.: 365,693

[22] Filed: Apr. 5, 1982

[30] Foreign Application Priority Data

Apr. 3, 1981 [FR] France ............................. 81 06809
Apr. 3, 1981 [FR] France ............................. 81 06810

[51] Int. Cl.³ ............................................. H04J 3/00
[52] U.S. Cl. ....................................................... 370/66
[58] Field of Search .................. 370/58, 66, 68, 16, 370/63

[56] References Cited

U.S. PATENT DOCUMENTS

| | | | |
|---|---|---|---|
| 3,823,269 | 7/1974 | Saito | 370/14 |
| 3,912,873 | 10/1975 | Skaperda | 179/18 FC |
| 4,064,369 | 12/1977 | Batocletti | 370/14 |
| 4,074,077 | 2/1978 | Charransol et al. | 370/58 |
| 4,107,480 | 8/1978 | Schlichte | 370/58 |
| 4,320,501 | 3/1982 | Le Dieu et al. | 370/68 |

OTHER PUBLICATIONS

"A Digital Communication System of Telephone Exchanges in West Germany"; Prager; Slaboprovdy Obz (Czech), vol. 42, No. 9 1981; pp. 455-457.
Electrical Communication vol. 54, No. 3, 1, 2, Londres, GB, P. C. Richards "ITT 1240 Digital Exchange. Cost Effective Digital Switching for up to 100,000 lines" pp. 205-214.
The Post Office Electrical Engineers Journal, vol. 73, Apr. 1980 J. N. A. Risbridger "System X Subsystems—Part 1: "The Digital Switching Subsystem" pp. 19-26.

Primary Examiner—Douglas W. Olms
Assistant Examiner—Frank M. Scutch, III
Attorney, Agent, or Firm—Sughrue, Mion, Zinn, Macpeak & Seas

[57] ABSTRACT

A digital switching network in an exchange having distributed control and a central switching network, the switching network comprising a plurality of independent planes, each of which is connected via inlet and outlet multiplex links to terminal units which include means for connecting terminals to said multiplex links, wherein each plane comprises synchronized switches (CX1) each equipped with a marker (MQ1) and constituting a single switching stage, the switches being connected in parallel to the inlet links (LE) of the plane, and each switch serving a respective group of the outlet links (LS), each multiplex link serving a group of terminal units (UT) in parallel, with each group of terminal units being connected to each plane of the switching network by at least one multiplex link, each switch being modular and including a control memory circuit driven by the associated marker (MQ), and a plurality of buffer memory circuits constituting square switching matrices, each of said square switching matrices being connected to a portion of the inlet links served by the switch and to all of the outlet links served thereby.

5 Claims, 10 Drawing Figures

DIGITAL SWITCHING NETWORK

The invention relates to a digital switching network for an exchange having distributed control. The invention is applicable to the telecommunications and computing industries, and in particular to time division telephone exchanges.

BACKGROUND OF THE INVENTION

Ever since time division switching was introduced, designs have been produced for large capacity switches and network organizations. For example, a basic switch with a capacity of 32 PCM links is described in CIT-ALCATEL's French Pat. No. 1511678.

Multistage switching networks are described in French Pat. Nos. 6916790 (corresponding to U.S. Pat. No. 3,754,100), 7033980 (corresponding to U.S. Pat. No. 3,999,162), and 7104655. Efforts have been made to improve component modularity, to optimize the equipment installed to facilitate extensions and to increase reliability so as to reduce the number of emergency service calls. These aims have been achieved by improving the internal structure of an exchange, see for example French Pat. Nos. 6916790 and 7830715 (corresponding to U.S. Pat. No. 4,320,501), and by improving organization concerning "inter-aid" (i.e. switching over to spare units) while using as little redundant equipment as possible, see for example French Pat. No. 7818221 (corresponding to U.S. Pat. No. 4,276,637).

Further, the flexibility of digital switching has led to the functions of the switching network being extended. Thus, PCM links to signalling sender/receivers and control links between control units and terminal units, eg. units including a logic circuit for controlling telephone equipment such as signal generators, operator positions, alarm equipment, or other circuits, are now all performed via the switching network. Reference can be made, for example, to CIT-ALCATEL's French Pat. Nos. 7905971 (corresponding to U.S. Pat. No. 4,305,148) and 7911593.

The integration of computing facilities into telecommunications networks is calling for ever higher degrees of equipment modularity and reliability, together with the possibility of reconfiguring the network without manual intervention, and monitoring it as exhaustively as possible while using few specialized monitoring means in comparison with the means that would be required for implementing such methods in a centrally controlled exchange, as described for example in CIT-ALCATEL's French Pat. No. 7925475 (corresponding to U.S. Pat. No. 4,402,074).

Preferred embodiments of the present invention provide a switching network that is simple, modular, and self-checking. Its simplicity makes it possible to provide a high degree of redundancy at low cost, thereby increasing the reliability of the network and so reducing emergency service calls to the extremely rare cases of multiple faults occurring on an entire set of redundant units.

SUMMARY OF THE INVENTION

The present invention provides a digital switching network in an exchange having distributed control and a central switching network, the switching network comprising a plurality of independent planes, each of which is connected via inlet and outlet multiplex links to terminal units which include means for connecting terminals to said multiplex links, wherein each plane comprises synchronized switches each equipped with a marker and constituting a single switching stage, the switches being connected in parallel to the inlet links of the plane, and each switch serving a respective group of the outlet links, each multiplex link serving a group of terminal units in parallel, with each group of terminal units being connected to each plane of the switching network by at least one multiplex link, each switch being modular and including a control memory circuit driven by the associated marker, and a plurality of buffer memory circuits constituting square switching matrices, i.e., matrices having an equal number of inputs and outputs, each of said square switching matrices being connected to a portion of the inlet links served by the switch and to all of the outlet links served thereby.

BRIEF DESCRIPTION OF THE DRAWINGS

An embodiment of the invention is described by way of example with reference to the accompanying drawings in which.

DETAILED DESCRIPTION OF THE INVENTION

Figure 1:
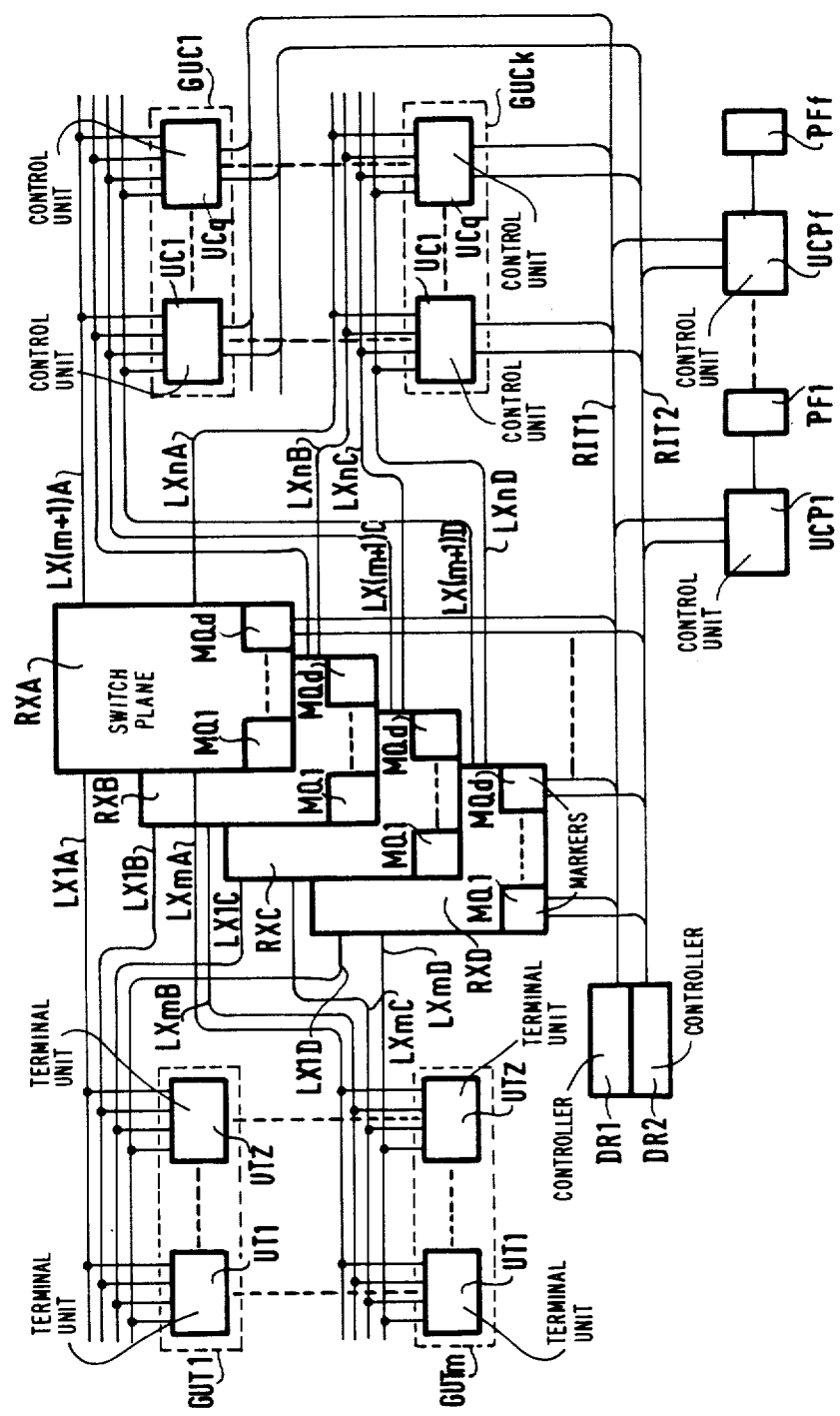
FIG. 1 is an overall block diagram of an exchange having a time division switching network.

The time division exchange shown in simplified manner in FIG. 1 comprises three main portions:

(1) m groups of terminal units GUT1 to GUTm comprising subscriber terminals, analog and digital circuits, and auxiliary signalling terminals for applying tones or recorded announcements to subscriber lines, for testing subscriber lines and circuits, together with conference circuits, etc . . .

(2) A central switching network having a single stage of switching. The network is organized in independent planes, e.g. four planes RXA to RXD. The figures given in this description are merely by way of example and to simplify the drawings.

(3) Exchange control means of distributed architecture constituted by k groups of GUC1 to GUCK of identical control units UC, eg. microprocessors. The control units per se UC1 to UCq are interchangeable. The control means also includes control units UCP1 to UCPf for controlling groups of peripherals PF1 to PFf. These control units may be substantially identical to the preceding control units, but they cannot be totally interchangeable on account of their physical connections with the peripherals.

The above three portions of the exchange are interconnected as follows:

(1) The terminal units UT (UT1 to UTz) are connected to each of the planes RXA to RXD of the switching network via multiplex links LX such as LX1A to LXmD each of which comprises 32 time slots which are 8 bits wide and operating at 2 M bits/sec in each transmission direction. The terminal units UT of each group are connected in parallel to the same multiplex links LX.

(2) The control units UC1 to UCq are likewise connected to the switching network via multiplex links LX(m+1)A to LXnD, with one multiplex link LX per group GUC to each plane of the network. Messages interchanged between control units and terminal units are transmitted via time slots in the links LX which are connected by the switching network in a semi-permanent and reconfigurable manner. Data transmission channels are thus provided having a data rate of 64 K bits/sec which are used according to the so-called HDLC procedure defined in the CCITT's standard ISO.

(3) The control units UC and UCP are interconnected by point-to-point links RIT1 and RIT2 which are doubled up for safety reasons. They are serial links which likewise use the HDLC procedure. Access to these links is managed by a duplicated controller DR1, DR2 which authorizes transmission thereover and which supervises the durations of such transmissions. The link comprises five pairs of wires going to each station connected thereto, for the purposes of calling, authorization, clock transmission, signal transmission and signal reception.

Connections between the control units UC and the terminal units UT are established via the switching network by means of semi-permanent connections between PCM time slots.

The central switching network RXA to RXD is controlled by markers MQl to MQd which are controlled by the control units via the said links RIT1 and RIT2.

All the above-mentioned units: UT, UC, UCP and MQ are provided with respective send/receive circuits for interchanging HDLC type messages, eg. an MC 6854 type circuit manufactured by MOTOROLA or an 8273 circuit manufactured by INTEL.

It is necessary to provide a switching stage in the terminal units UT in order to connect any terminal to any time slot in any of the multiplex links LX serving said terminal unit.

Figure 2:
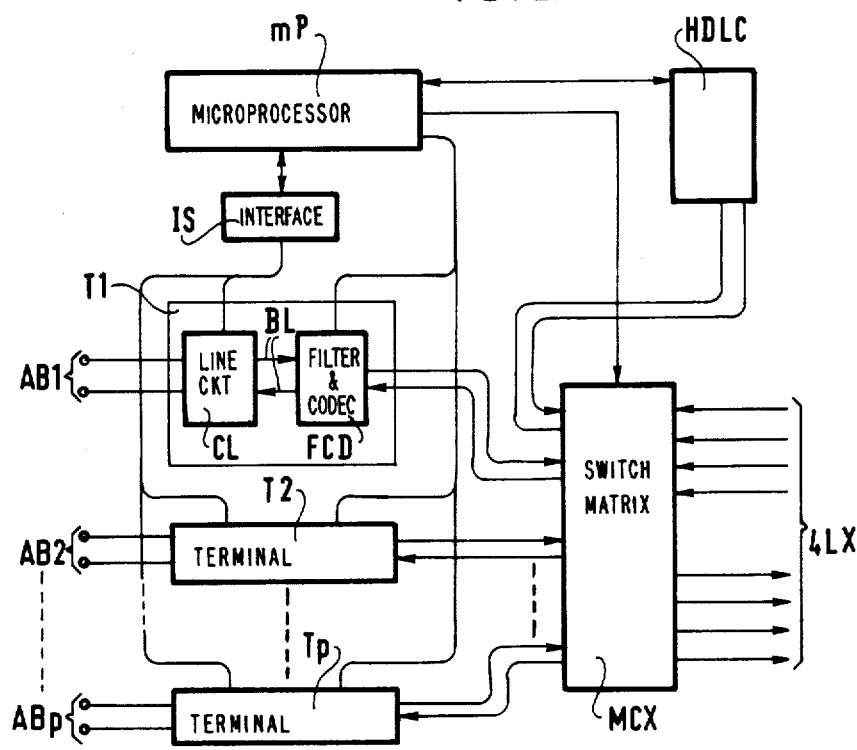
FIG. 2 is a block diagram of a subscriber terminal unit.

An example of a subscriber terminal unit is shown in FIG. 2. Each subscriber terminal T1 to Tp is constituted by a line circuit CL connected to a respective subscriber AB1 to ABp and comprising power supply means, protector means, loop supervisory means, ringing current injector means, and a filter and codec circuit FCD providing an interface between analog and digital signals.

The terminal unit UT is controlled by a microprocessor mP connected to the four multiplex links LX via an HDLC type send/receive circuit. The switching stage in this example is a space type matrix MCX.

Time switching is performed by the filtering and codec circuits FCD by synchronizing onto a chosen time slot under control of the microprocessor. The microprocessor also controls the line circuits CL via a supervisory and control interface IS.

Figure 3:
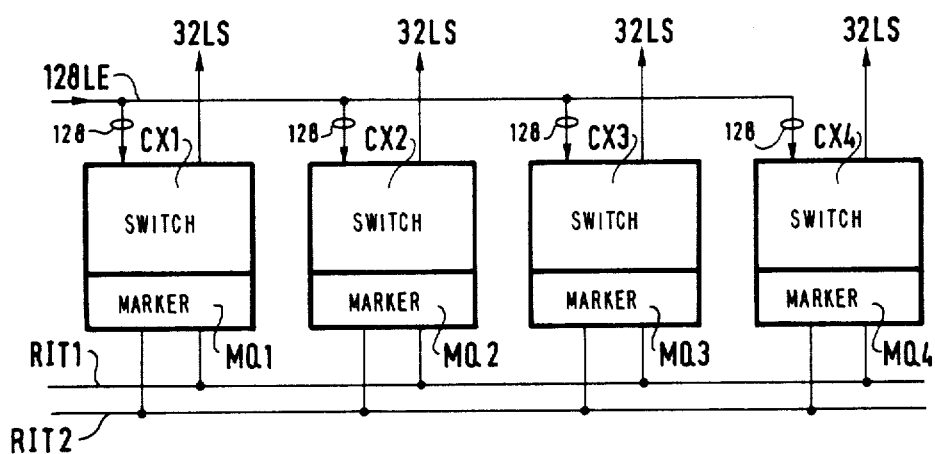
FIG. 3 is a general diagram of a single plane in a switching network in accordance with the invention.

The central switching network is shown in more detail in FIG. 3. It comprises a single switching stage and is organized in four independent planes. Each plane of the switching network has a capacity of 128 two-way multiplex links LX, i.e. it can connect any time slot from any one of 128 inlet links LE to any time slot in one of 128 outlet links LS.

One plane of the switching network comprises four switches CX1 to CX4, each of which is provided with a respective marker MQ1 to MQ4, and each of which has a capacity of 128 inlet links LE and 32 outlet links LS. The inlet links LE are thus multipled over the four switches of any one plane.

Figure 4:
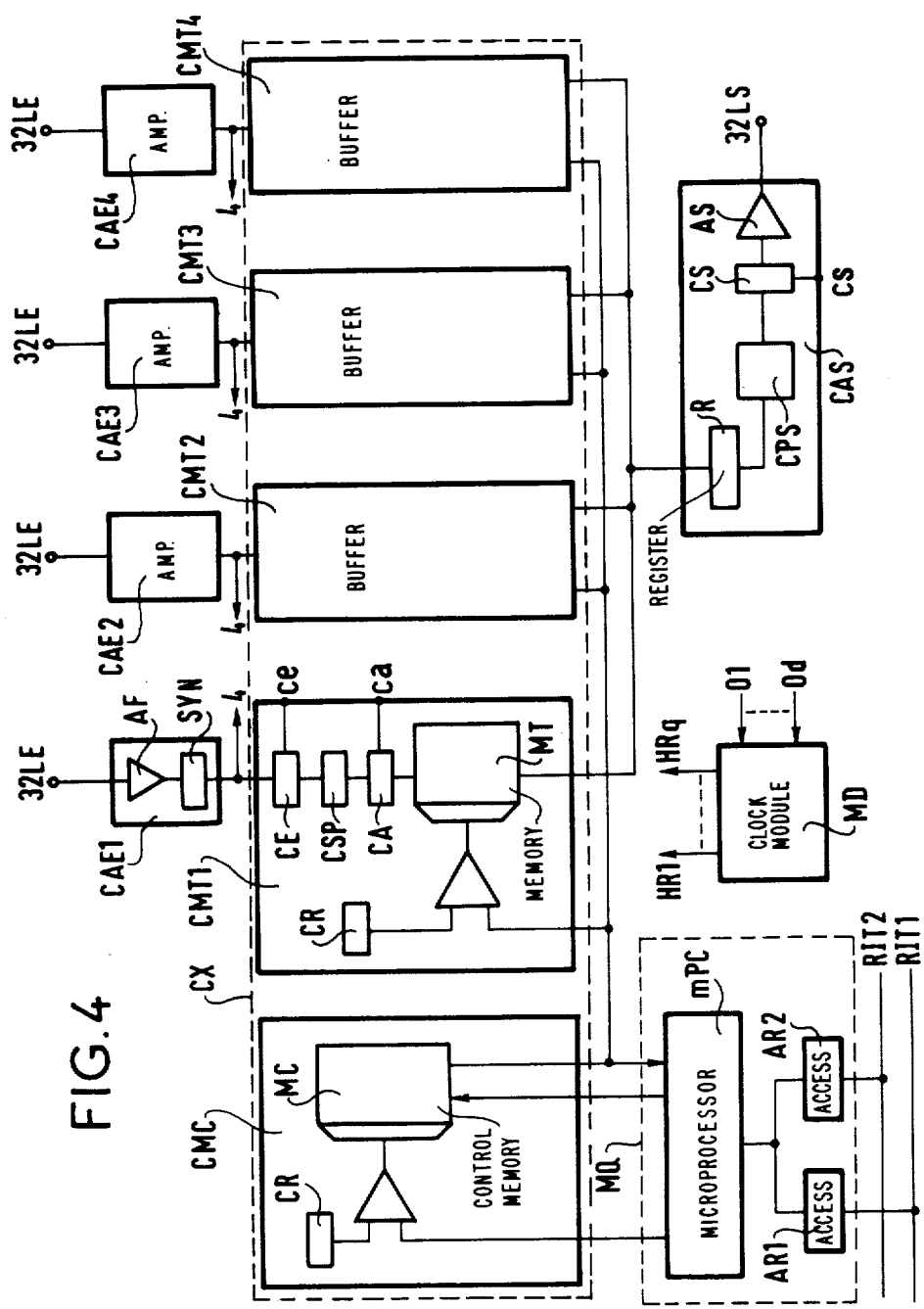
FIG. 4 is a general diagram of a time division switch in a switching network in accordance with the invention.

The structure of a switch CX is shown in FIG. 4. The 128 inlet links LE are distributed over four inlet amplifier circuits CAE1 to CAE4, each of which comprises 32 amplifiers AF and a synchronizing circuit SYN. The inlet amplifier circuits CAE are common to the four switches CX of the same plane and each of them serves 32 of the 128 inlet links LE connected to said plane. Each inlet amplifier circuit CAE is connected to one of four buffer memory circuits CMT1 to CMT4 in each switch CX. These buffer memory circuits constitute square switching matrices and each comprises in succession: an inlet sampling and control circuit CE, a serial to parallel converter circuit CSP, and an access circuit CA to a buffer memory MT. The access circuit CA also provides for injecting samples to perform so-called "active" checking of the switching network.

The buffer memory MT comprises 1024 8 bit words, i.e. one word for each time slot in the 32 inlet links LE connectable thereto. Data is written to the memory and read therefrom at a rate of 8 MHz, i.e. at a rate approaching the maximum usable with the TTL technology used.

"Downstream control" addressing is used, i.e. write addressing is provided by a counter CR while read addressing is provided by a control circuit CMC under the control of the marker MQ. A control memory MC provides the read addresses for use in the memories MT of the four buffer memory circuits CMT1 to CMT4. The control memory MC is itself cyclically addressed for reading, and is addressed by the marker for writing in order to store each new connection or disconnection.

The marker MQ comprises a microprocessor mPC which is connected to the links RIT1 and RIT2 via access circuits AR1 and AR2 described below.

The outlets of the buffer memories MT of the four buffer memory circuits CMT1 to CMT4 of a given plane are connected in parallel to an outlet amplifier circuit CAS comprising buffer registers R connected to a parallel/serial conversion circuit CPS which is itself connected to an outlet sampling circuit CS serving a group of 32 amplifiers AS each of which is connected to a different one of the outlets links LS.

A set of clock signals HR1 to HRq required to make the switch operate is provided by a clock signal distribution module MD which is itself driven by oscillators 0l to 0d (not shown).

Figure 5:
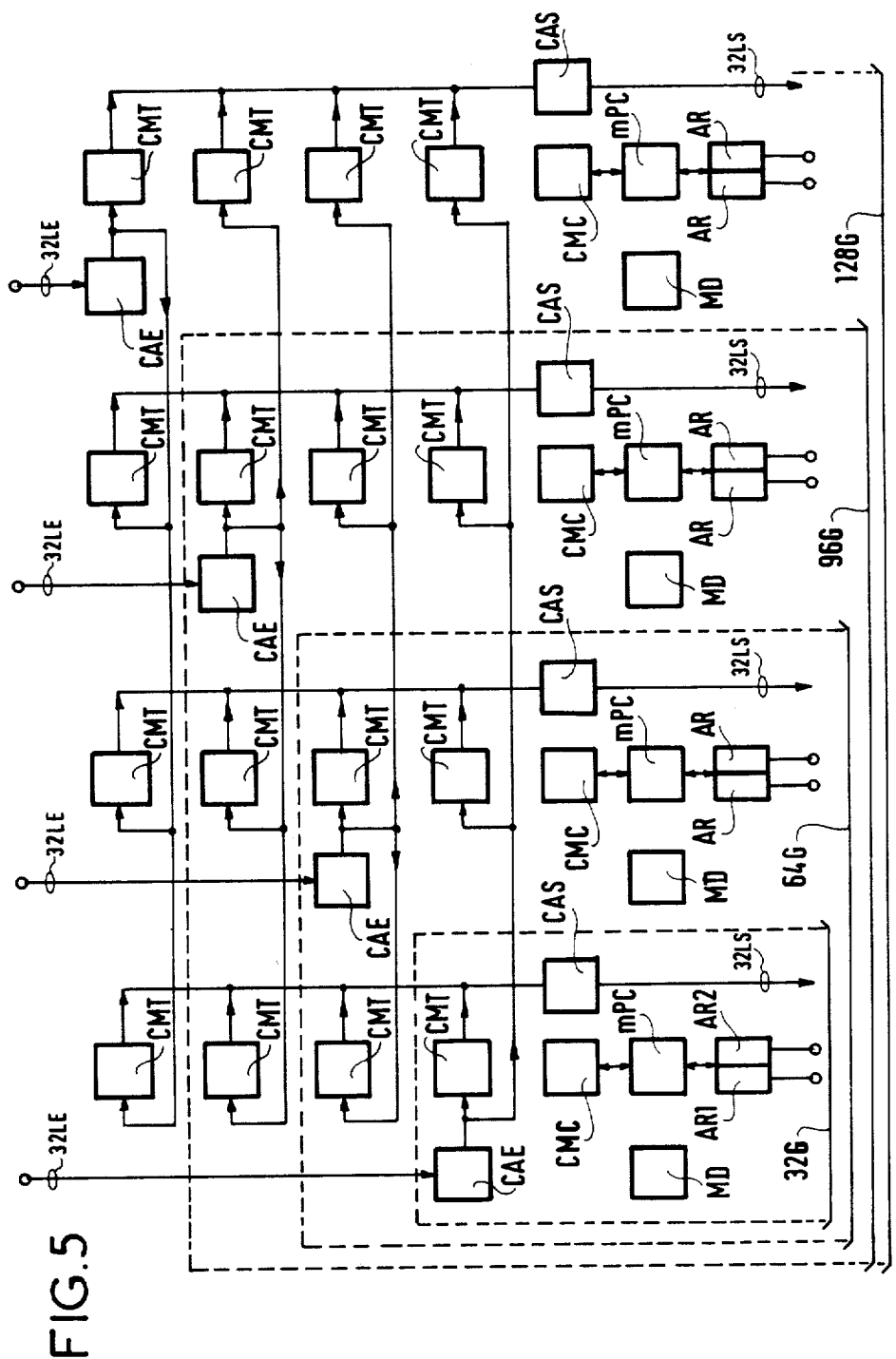
FIG. 5 is a block diagram showing the modularity of a switching network in accordance with the invention.

The modular nature of the switching network can be seen from FIG. 5, and is as follows:

(1) For up to 32 groups G of terminal units GUT, or control units GUC, it is sufficient to equip one switch with a single buffer memory circuit CMT.
(2) For 33 to 64 groups, two switches each equipped with two buffer memories are required.
(3) For 65 to 96 groups, three switches each equipped with three buffer memories are required.
(4) For 97 to 128 groups, four switches fully equipped with four buffer memories are required.

The following description relates to one particular embodiment of the main circuits constituting the switches.

Figure 6A:
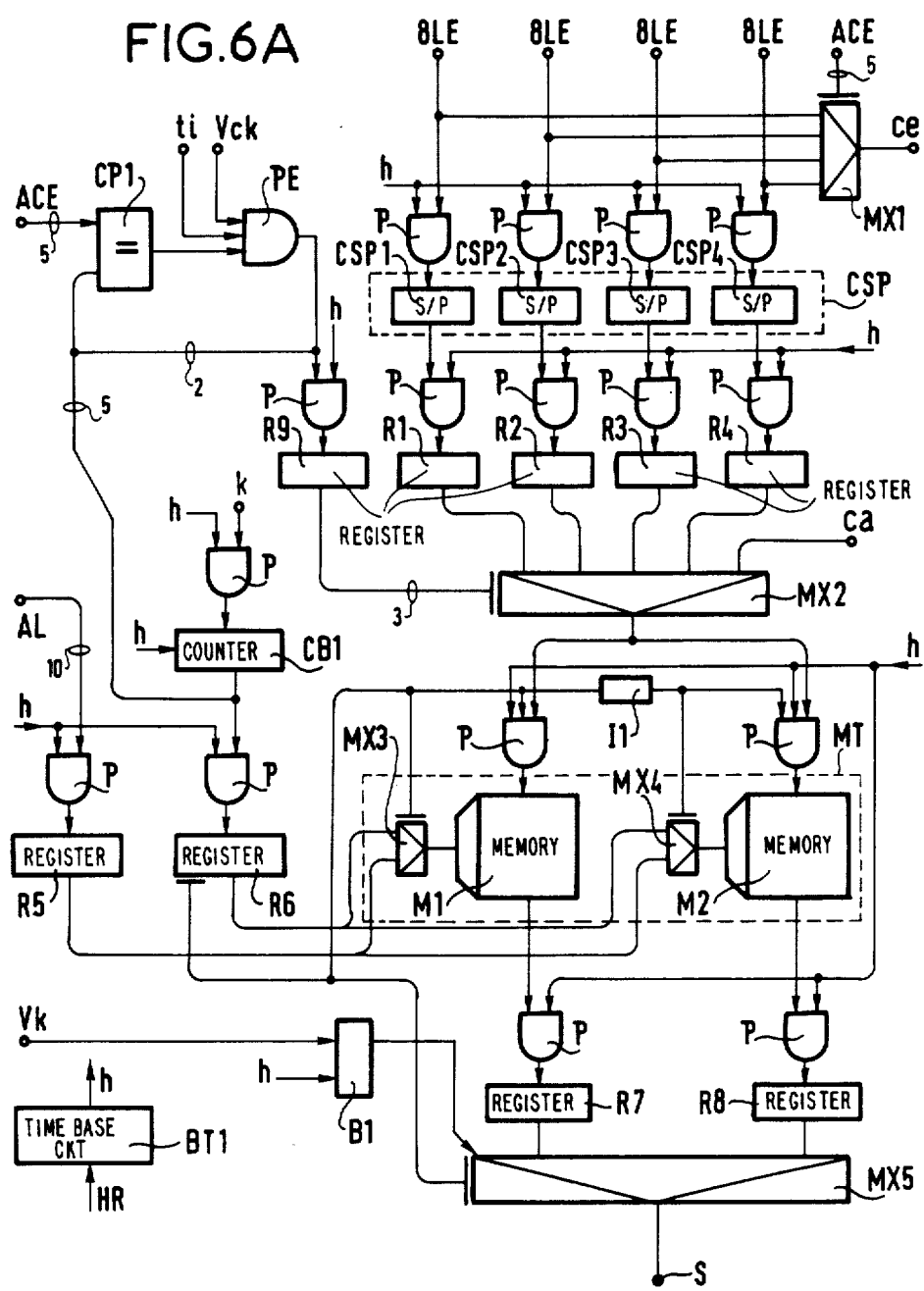
FIGS. 6A and 6B constitute a single circuit diagram in two halves joined at a point S, and together with FIG. 7 they constitute circuit diagrams of a buffer memory, an output amplifier and a switch control circuit for the switch shown in FIG. 4.
Figure 6B:
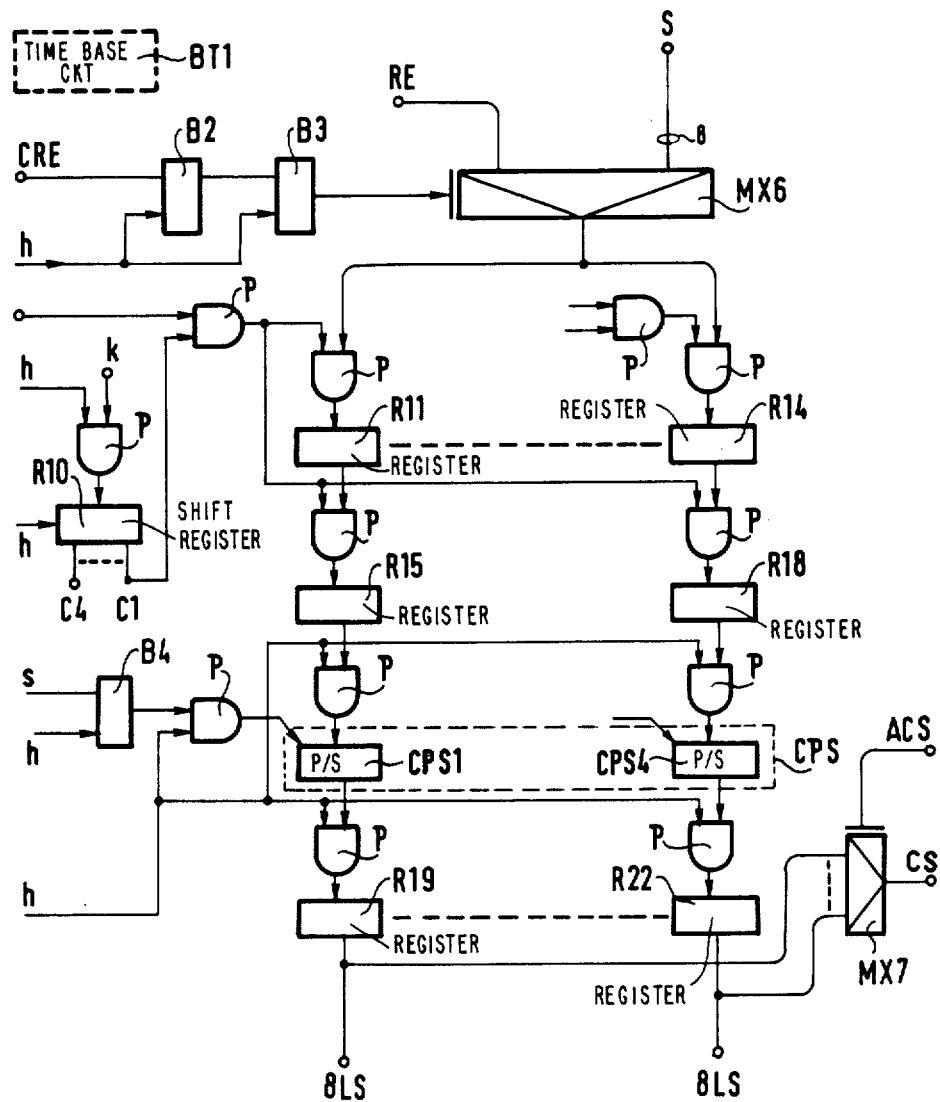

The buffer memory circuits CMT and the outlet amplifier circuits CAS are shown in FIGS. 6A and 6B, respectively. Clock and synchronizing signals are distributed via a time base circuit BT1 which is itself synchronized with the signal distribution module MD of the switch (FIG. 4). The time base circuit BT1 delivers clock signals "h" which are not described in detail since they are well known to the person skilled in the art, and they can be derived from the manner in which the circuits operate as described below.

A signal ce is sampled from the 32 inlet links LE of the time switch by means of a multiplexer MX1 having respective inputs connected to the 32 links. The address ACE of the link to be checked is provided by the circuit CMC of the switch CX.

The converter circuit CSP comprises four integrated circuits CSP1 to CSP4 of the MICSPA type (registers for converting PCM encoded samples between serial and parallel modes of transmission). Each of them is connected to eight of the 32 inlet links to the buffer memory circuit CMT via eight gates P. The outlets from the circuits CSP1 to CSP4 are connected to four registers R1 to R4, respectively. Samples are switched to the buffer memory via a multiplexer MX2 having one inlet connected to receive an active test code Ca which may be hard wired.

AND gates commonly designated by P, are enabled by the time base BT1 to control the inputs to the registers of the conversion circuits CSP, to the buffer memory MT, and in general, various other transfers. Such gates will no longer be referred to specifically in the description, but they can be seen in the drawings.

To enable the buffer memory MT to be used at maximum speed, it is split into two portions M1 and M2, one of which is used in a write mode while the other is being used in a read mode. Read addressing AL is provided by the control memory MC of the switch CX via a register R5 and multiplexers MX3 and MX4. Write addressing is supplied by a counter CB1 counting at a frequency of 8 MHz and arrives via a register R6 and the same multiplexers MX3 and MX4. The counter has twice the necessary capacity (11 bits rather than the 10 required to address 1024 words) in order to alternate between the two buffer memories. The least significant bit directly controls the multiplexer MX3 and the input to the memory M1, and controls the multiplexer MX4 for input to the memory M2 via an inverter I1. The counter CB1 is synchronized by the time base BT1 (by loading the hard wired starting value K).

The outlet from the memories M1 and M2 is applied to an eight bit parallel output S from the buffer memory circuit CMT via registers R7 and R8 and a multiplexer MX5 addressed by the least significant bit of the counter CB2 and controlled by a bistable B1 which receives an enabling signal Vk for enabling access to the outlet circuit CAS associated with a switch CX. The signal Vk (k=1 to 4) is delivered by the control circuit CMC of the switch and serves to select that one of the memory circuits CMT whose buffer memory MT is going to supply the sample to be output at a particular instant by the switch CX.

To inject the active test signal "Ca", the inlet link address ACE supplied by the control circuit CMC is compared by a comparator CP1 with the five most significant bits of the counter CB1. The register R9 for addressing the multiplexer MX2 receives the two most significant bits from the counter CB1 and a bit supplied by an AND gate PE which is connected to receive the output from the comparator CP1, an injection pulse ti supplied by the memory control circuit CMC and synchronized with the time slot in question, and a circuit enable signal Vck (k=1 to 4) supplied by the same control circuit CMC.

At the inlet to the outlet amplification circuit CAS, a multiplexer MX6 selects one of the four outputs S from the buffer memory CMT1 to CMT4 in the switch, or else a hard wired idle code RE which is systematically applied to non-connected outlet links LS. A signal CRE for injecting this code is transmitted by the control circuit CME via synchronizing bistables B2 and B3 to the addressing input of the multiplexer MX6.

The output of multiplexer MX6 provides samples which are applied successively to four registers R11 to R14 under the control of a four bit shift register R10 which receives clock pulses as at frequency of 8 MHz in synchronization with the outlet links LS.

The samples finally pass through intermediate registers R15 to R18, the conversion circuit CPS which is constituted by four MICSPA type circuits CPS1 to CPS4 capable of performing parallel to serial conversions, and four output buffer registers R19 to R22.

The inputs to the circuit CPS1 to CPS4 are enabled by a bistable B4 which is actuated in synchronization with each outlet time slot.

The outlet is checked by taking samples CS via a multiplexer MX7 whose five bit address AC5 is supplied by the control circuit CMC.

Figure 7:
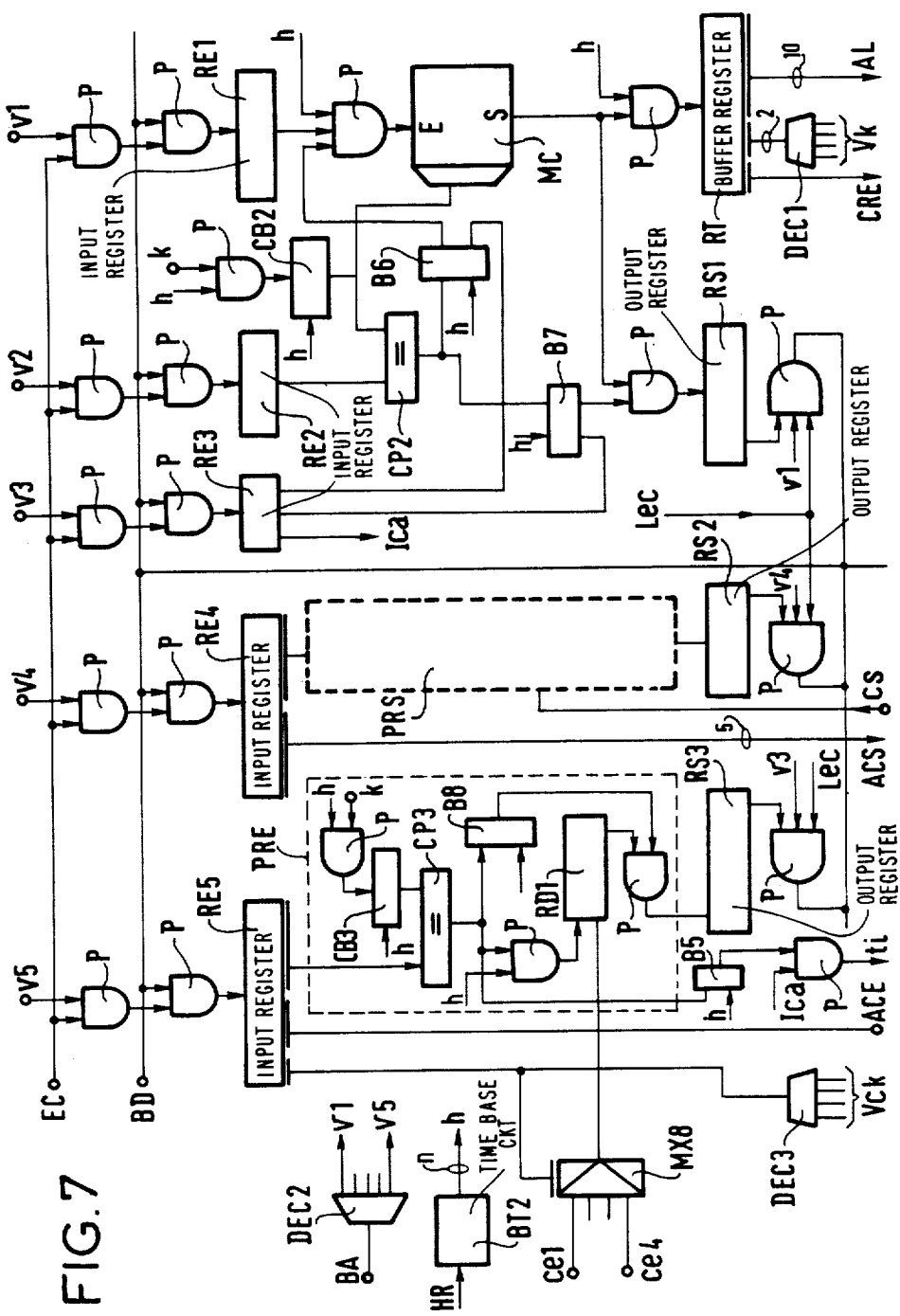

The control circuit CMC is shown in FIG. 7. The main components of this circuit are the control memory MC with a buffer register RT for addressing the buffer memories, active and passive checking control circuits B5 and PRE and PRS, respectively, and inlet and outlet registers RE1 to RE5, and RS1 to RS3 connected to the data bus BD of the microprocessor mPC of the marker (see also FIG. 8).

These circuits are driven by a time base circuit BT2 which is synchronized with the module MB for distributing signals in the switch CX.

The signals for enabling transfers between the registers and the bus BD are supplied by decoding three bits of the address bus BA of the microprocessor mPC by a decoder DEC2 which provides enabling signals v1 to v5, and by read and write control wires Lec and EC coming from the same microprocessor.

The control memory MC comprises 1024 13-bit words making it possible to control 32×32 time slots carried by the 32 outlet links LS. Ten bits are used at the output from the register RT to provide the address AL of the buffer memories, two bits are used to provide the enable signal Vk to enable one of the buffer memory circuits CMT via a decoder DEC1, and one bit is used to control injection of the idle code via a signal CRE.

The following description details the functions performed under microprocessor control, and outlines circuit implementation.

Data is written into the memory MC as follows:
(1) The register RE1 is loaded (signals v1 and EC).
(2) The register RE2 is loaded to contain the address of the word to be written (signals v2 and EC).
(3) Writing: the memory is addressed by the counter CB2 and a comparator CP2 activates a bistable B6 to enable writing when the counter has reached the value written in the register RE2.

The memory MC is read by the marker to test the circuit CMC by comparing the value read with an image of the memory MC written in the marker's memory as follows:
(1) The address is loaded (signals v2 and EC).
(2) The loading memory of the register RS1 is read, as enabled by the comparator CP2 and bistable B7.
(3) The contents of the register RS1 are transferred to the bus BD (v1 and Lec).

Inlet data is sampled as follows:
(1) A 12-bit address is loaded into the register RE5 (signals v5 and EC): two bits address a multiplexer MX8 which receives the samples from the circuit CMT (Ce1 to Ce4); five bits supply the address ACE, i.e. the number of the link LE; and five bits supply the address of the time slot.
(2) Synchronization onto the time slot to be checked is provided in the circuit PRE by the comparator CP3 comparing the address with the contents of a counter CB3 which is synchronized with the time base.
(3) The sample is loaded at the rate of the link LE, i.e. 2 MHz, into a shift register RD1.
(4) It is transferred into the outlet register RS3 under the control of a bistable B8 which is activated at the end of the sample.

Outlet sampling is performed on identical lines, using registers RE4 and RS2 and a circuit PRS similar to the circuit PRE.

Active checking is performed by:
(1) Loading the register RE5 with an enable signal for the circuit VCk being supplied by a decoder DEC3 decoding the two bits of the address of the circuit CMT.
(2) The register RE3 is loaded. This register is a control register which provides an injection control signal Ica of the code Ca together with enabling, reading and writing signals for the memory via bistables B6 and B7, and also resetting to zero signals. A bistable B5 enabled by the outlet signal from the comparator CP3 provides a ti pulse when the signal Ica is provided.

Figure 8:
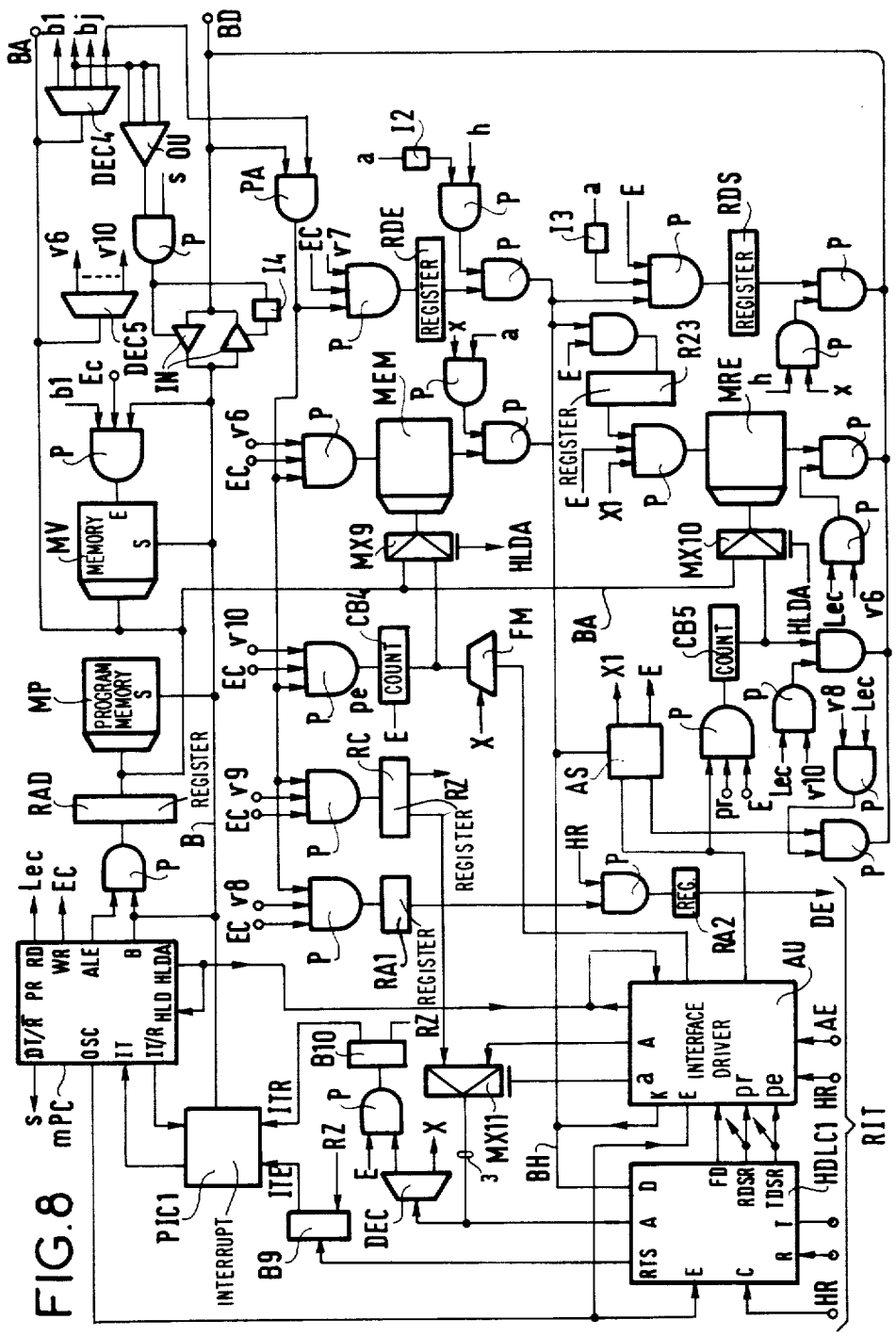
FIG. 8 is a circuit diagram of a marker and a circuit for controlling access to control links.

The marker MQ1 and the access to the point-to-point links RIT are shown in FIG. 8.

The marker MQ1 includes a microprocessor mPC, eg. an INTEL 8086 circuit associated with an INTEL 8284 clock circuit. An internal bus B feeds the address bus BA via an address register RAD, and a data bus BD via a directional interface IN under the control of the microprocessor mPC. The interface IN direction is controlled by a combination of an output signal s from the DT/R output of the microprocessor combined with the input/output address received by an OR gate and a decoder DEC4.

The microprocessor MPC is associated with a program memory MP, e.g. a REPROM and a read/write data memory MV.

The unit providing access to the RIT links comprises a circuit HDLC1 for controlling data interchange using the HDLC procedure, an interface driver AU and intermediate buffer memory memories for sending MEM and receiving MRE.

The HDLC1 circuit may, for example, be a MOTOROLA type 6854 circuit.

The driver AU is made in a known manner from a logic circuit comprising a read only memory associated with an input register to receive input information, and an output register to receive data from the memory. Both registers are clocked by clock signals supplied to an input E via the OSC output from the microprocessor, which signals also drive the circuit HDLC1. The inlet to the access unit is connected to the bus BD under the control of an access gate PA itself controlled by an address bj coming from the decoder DEC4.

Access is provided in a manner analagous to that already described for the control memory circuit CMC:
(1) Control signals WR and RD (wires EC and Lec) from the microprocessor are used together with a select signal (v6 to v10) obtained by the decoder DEC5 acting on the address.
(2) Multiplexed addressing of the memories MEM and MRE, firstly by the microprocessor via the bus BA and secondly by the interface driver AU via the counters CB4 and CB5 and the multiplexers MX9 and MX10 in a manner described below.
(3) The following additional circuits are used:
 (a) An inlet data register RDE connected between the gate PA and the bus BH of the circuit HDLC1.
 (b) An outlet data register RDS between the buses BH and BD.
 (c) An inlet buffer register R23 for the memory MRE.
 (d) A control register RC containing instructions for resetting the internal registers of the circuit HDLC1 to zero (inlet A corresponding to the instructions R/W, RS0, RS1 of the 6854 circuit) supplied via a multiplexer MX11 driven by the output from the interface driver AU, whereby the circuit HDLC1 can be driven either by the microprocessor or by the interface driver.
 (e) Calling registers RA1 and RA2 to provide access to the link RIT, the microprocessor loads the register RA1 and clock signals HR from the link RIT transfer the information into the register RA2 and apply a mark to a wire DE, authorization to send in reply AE is received by the driver AU.
 (f) A circuit for recognizing the control unit address AS, this address is used to identify the control units connected to the RIT links, and is hard wired in each circuit to be compared on receiving a signal with the internal address in the messages, and on sending a signal it is inserted into the messages.
 (g) A programmable circuit PIC handling microprocessor interrupts in order to cope with requests for service from the interface driver both when sending and when receiving. An INTEL 8259 circuit could be used, for example. For transmission, the output RTS of the circuit HDLC1 provides an interrupt signal ITE directly via a bistable B9. For reception, an interrupt signal ITR is provided by the driver AU which actuates a bistable B10. These bistables are reset to zero by a signal RZ supplied by the microprocessor via the register RC.

These circuits operate as follows:

When the microprocessor mPC requests to send:
(1) The memory MEM is loaded by the microprocessor mPC, the memory may contain a complete n byte message with the address of the last byte being loaded into the counter CB4.
(2) The memory is read by the circuit HDLC1 under the control of the interface driver.
(3) The counter CB4 is caused to count down under the control of a ready to send signal pe supplied by the circuit HDLC1 indicating that its send register is empty.
(4) Access from the output of the memory to the bus BH is enabled by the interface driver whose outputs a and A supply a code X for controlling writing in the send register of the circuit HDLC1.

(5) When the counter has counted down to 0, an end of message decoder FM informs the driver, and the driver causes the circuit HDLC1 to send appropriate end of message codes.

To receive messages over the link RIT, detection of the beginning of a message is marked on an output FD of the circuit HDLC1, thereby informing the driver AU. The driver causes the receive register of the circuit HDLC1 to be read and the circuit AS recognizes the address of the marker. For each byte received, the circuit HDLC1 activates its output RDSR to supply a ready to receive signal pr. The signal pr enables the clock to the counter CB5. The interface driver causes the receive register of the circuit HDLC1 to be read and the data to be written into the memory MRE by means of a signal X1. The driver then calls the microprocessor mPC. Several messages may be queued up in the memory MRE.

The microprocessor reads the counter CB5 and each of the messages contained in the memory.

Each message gives rise to an acknowledgement message in return.

The functions performed by the marker are essentially functions of connection, disconnection and surveillance.

The marker executes orders supplied by the control unit UC with which it is associated. Some orders give rise to a report message.

The connection functions serve to set up a one-way connection, i.e. between one time slot of an inlet link LE and one time slot of an outlet link LS. Each connection may be associated with three sorts of surveillance: active surveillance of the connection (message bit C); a test to see whether the outlet link LX is idle before connection (bit R); and a test to verify conformity with a pre-existing connection (bit T).

The data part of a message comprises seven bytes:
One function byte having the format 0 0 0 0 1 T R C; and
Three 2-byte addresses (inlet address, outlet address, old inlet address for use in the conformity test).

Disconnection functions are simple disconnection, with or without a conformity test, and overall disconnection of a plurality of time slots in a single outlet link LS.

The message comprises six bytes:
Function code (one byte);
Address of the appropriate outlet link LS (one byte);
32 bytes, each corresponding to a respective one of 32 time slots, indicating the time slots to be disconnected.

Surveillance comprises active checking, passive checking and checking by rereading a connection in the control memory MC.

Figure 9:
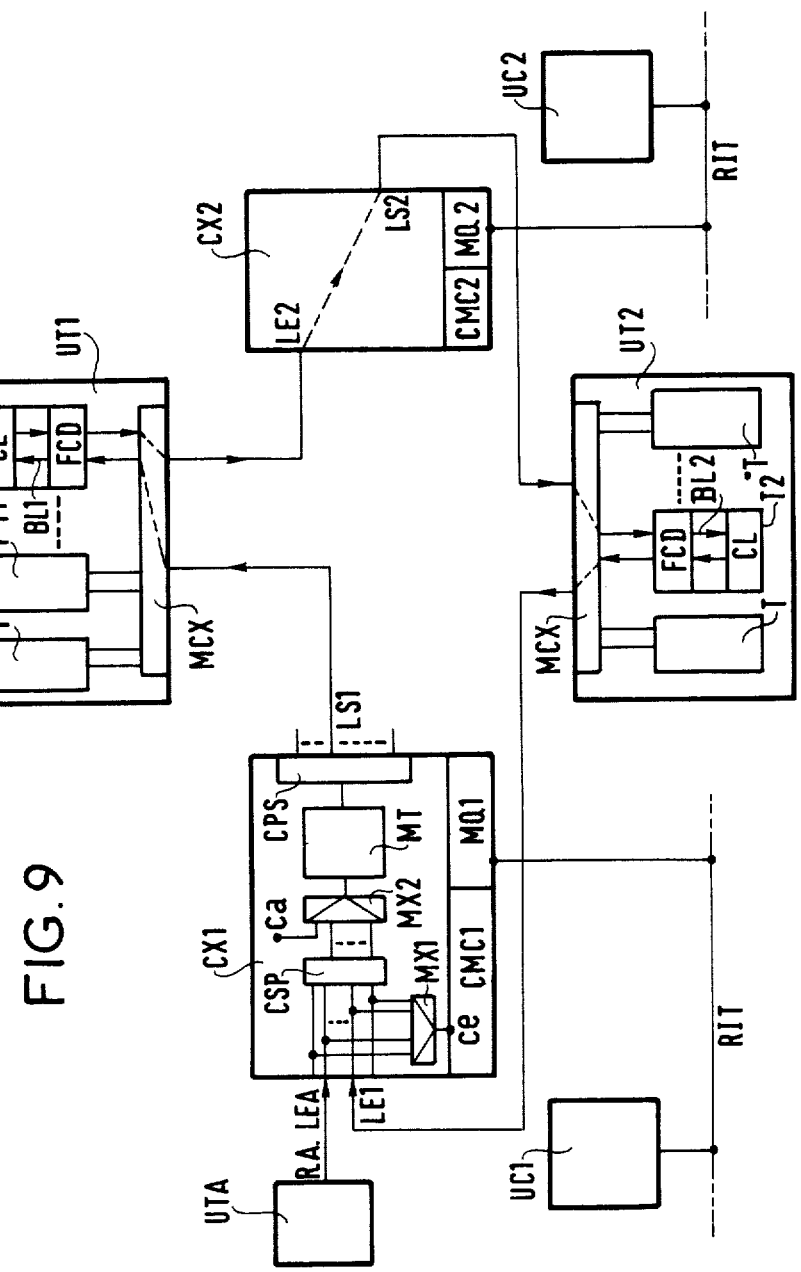
FIG. 9 is a diagram showing how a path through the exchange is verified.

The means described provide thorough checking of the links established via the switching network, eg. of conversation paths from the calling terminal to the called terminal. The method used for such checking consists in injecting an active check code from a marker, and in recovering the code at the inlet to the marker after it has travelled the length of the go and return conversation paths and passed through both terminals (see FIG. 9).

To do this, the inlet and outlet paths of the terminals must be looped, eg. upstream from the switching network or upstream from the circuit FCD, in which case the circuit FCD can also be checked.

There follows a description of the messages interchanged during such checking under the following conditions:

(1) The check is performed when the called party answers.
(2) The caller's terminal unit UT1 and the called terminal unit UT2 are controlled by different control units UC1 and UC2.
(3) The switch CX1 used to set up the path from the unit UT2 to the unit UT1 is the same as the switch which was used to set up the path from the auxiliary terminal unit UTA which provides ringing tone to the caller, and the terminal unit UT1.
(4) The switch CX2 which sets up the path in the direction UT1 to UT2 is in the same plane as the switch CX1.
(5) The choice of path and its setting up is performed by the control unit UC1 and UC2 communicating with each other and driving the markers MQ1 and MQ2, respectively, of said switches.

The actions and messages are as follows:

Before the called party answers, the called party receives ringing current and the caller is connected to the unit UTA to receive ringing tone RA.

(1) When the called party answers, the unit UT2 turns off ringing current and informs control unit UC2 which in turn informs control unit UC1.
(2) The control unit UC1 instructs (BL1) the terminal unit UT1 to loop the caller's terminal T1.
(3) The control unit UC1 instructs the marker MQ1 to replace the connection LEA-LSI by a connection LE1-LS1 using active checking.
(4) The control unit UC2 instructs the terminal unit UT2 to loop (LB2) the called terminal T2.
(5) The control unit UC2 instructs the marker MQ2 to set up the connection LE2-LS2.
(6) The marker MQ1 provides active checking by extracting the samples ce from the inlet LE1 and reports back to the control unit UC1.

Thereafter the terminals are unlooped and the control unit UC1 moves to a conversation phase and begins call charging.

Checking by comparing the code sent ca with the code received ce can be performed to some given degree of accuracy, eg. without taking the least significant bit into consideration.

There follows a description by way of example, of the steps followed during a local call, including: returning dial tone, dialling, translating dialling in the case of a rotary dial and in the case of a pushbutton dial, local selection, end of selection, connection with transmission checking over the established path, clearing down.

It is supposed that the called party is free, that the caller hangs up first, and that the terminals of the two parties are controlled by different control units UC1 and UC2. Indices 1 are given to units concerned with the caller and indices 2 to units concerned with the called party.

(A) Returning dial tone, dialling and translation of dial pulses in the case of a rotary dial:
Phase 1: the processor of the terminal unit UC1 scans its terminals cyclically to detect off-hook.
Phase 2: the terminal unit UC1 informs the control unit UC1 and indicates the number NT of the terminal T1 of the calling subscriber.

Phase 3: the control unit UC1 looks for a free time slot V1 between the terminal T1 and the switching network RX and for an access time slot V1A to tone generator unit UTton.

Phase 4: the control unit UC1 informs the corresponding MQ1 in the switching network and indicates the time slots to be interconnected.

Phase 5: the control unit UC1 warns the terminal unit UT1 that a connection is being set up between the terminal unit T1 and the tone generator UTton.

Phase 6: the terminal unit UT1 locally connects the terminal T1 to the chosen time slot V1 corresponding to one of the planes RXA of the switching network.

Phase 7: the calling terminal T1 receives dial tone IA from the tone generator UTton.

Phase 8: the terminal T1 sends the first digit CH1 to the terminal unit UT1.

Phase 9: as soon as the terminal unit UT1 receives the first dial pulse, it disconnects the terminal T1 from the time slot V1 to cut off the dial tone.

Phase 10: the terminal unit UT1 receives, identifies and transmits each digit CH2 to CHn to the control unit UC1.

Phase 11: after receiving two digits, the control unit UC1 performs a first translation for initial analysis of a possible routing.

Phase 12: complete translation is performed after the number of digits required, as determined by the first translation, have been received. Depending on the type of exchange and the nature of the call, the control unit UC1 may make a request to a centralized translation service implanted in another control unit.

(B) Returning dial tone, dialling and translation in the case of a multifrequency keypad subscriber. This case calls additionally for a multifrequency code receiver UTaux and a switch marker MQaux which connects the terminal units UT1 and UTaux during dialling by means of a loop using two different time slots, and two switches CX1 and CXaux situated in the same plane of the switching network.

Phases 1 and 2 are identical to phases 1 and 2 in the preceding case.

Phase 3: the control unit UC1 looks for a free time slot V1 to the terminal unit UT1 and a free time slot Vaux to a free dialling receiver.

Phase 4: orders are given to the markers MQ1 and MQaux to set up the necessary connections in both directions between the terminal unit UT1 and the unit UTaux.

Phase 5: the control unit UC1 informs the terminal unit UT1 that a dial signal receiver has been connected.

Phases 6 and 7 are identical to phases 6 and 7 in the preceding case (dial tone is sent by UTaux).

Phase 8: the terminal UT1 sends the first digit to the unit UTaux.

Phase 9: the unit UTaux interrupts dial tone IA.

Phases 10, 11 and 12 are identical to phases 10, 11 and 12 above.

Phase 13: the control unit UC1 sends a release insruction to the unit UTaux.

Phase 14: the control unit UC1 instructs the marker MQaux to disconnect the time slot towards the unit UTaux.

Phase 15: the control unit UC1 instructs the terminal unit UT1 to disconnect the terminal locally.

(C) Local selection

Phase 1: a call is made to the control unit UC2 which controls the terminal T2 of the called party. The call is made by the control unit UC1 and indicates the plane RXA of the switching network that is being used, the time slot V1 connected to the caller and the number NT2 of the called terminal T2.

Phase 2: the control unit UC2 determines the start of the called party: free, busy, transferred, or other. If free, the control unit seeks a free time slot V2 from the appropriate plane in the switching network to the terminal T2.

Phase 3: supposing that the terminal T2 is free but that there is no free time slot from the plane RXA (eg. because the corresponding link is out of service) the control unit UC2 replies to the unit UC1.

Phase 4: the control unit UC1 seeks a free time slot V1 in another plane, eg. RXB of the switching network.

Phase 5: the control unit UC1 informs the unit UC2 of the number of the plane and the time slot to be used.

Phase 6: the unit UC2 now seeks a slot.

Phase 7: the unit UC2 instructs the terminal unit UT2 to seize the terminal T2 and apply ringing current thereto.

Phase 8: end of selection: the unit UC2 replies to the phase 5 message from the unit UC1.

(D) End of selection

Phases 1 and 2: at the end of selection the control unit UC1 proceeds to store away data concerning the call (a message is sent to a long-term storage machine), and then seeks a slot VRA to connect a tone generator unit (UTton) to the terminal unit UT1 to return ringing tone to the caller.

Phase 3: the control unit UC1 instructs the marker MQ1 to connect time slots V1 and VRA.

Phase 4: the control unit UC1 instructs the teminal unit UT1 to locally connect the terminal T1 to the time slot V1.

Phase 5: the called party T2 answers and the terminal unit UT2 informs the control unit UC2 and then the control unit UC1, and stops sending ringing current to the called party.

(E) Connection with the path set up being checked

Phase 1: the control unit UC2 instructs the terminal unit UT2 to loop the filter and Codec circuit FCD of the terminal T2.

Phase 2: the marker MQ2 is instructed to connect time slot V2 (link LF2-LS2) to test the connection (FIG. 8).

Phase 3: the control unit UC1 instructs the terminal UT1 to loop the filter and codec circuit FCD of terminal T1.

Phase 4: the control unit UC1 instructs the marker MQ1 to set up the connection and perform the test.

Phase 5: the marker MQ1 reports the results of the test to the control unit UC1.

Phase 6: the control units UC1 and UC2 send instructions to unloop the filter and codec circuits FCD.

Phase 7: the control unit UC1 sets up charging at the beginning of conversation.

(F) End of call

Phase 1: the caller hangs up and this is detected by the regular scanning of the terminal unit UT1 which then informs the control unit UC1.

Phase 2: the control unit UC1 sends out a charge signal to the long-term data storage machine.

Phase 3: the control unit UC1 requests the control unit UC2 to release that part of the chain which is under its control.

Phase 4: the control unit UC1 instructs the terminal unit UT1 to disconnect the terminal T1 locally.

Phase 5: the control unit UC1 instructs the disconnection in the switching network of the time slots V-1, V-2.

Phase 6: the control unit UC2 hunts for a time slot VOCC to connect the terminal T2 to a tone generator unit UTton to send a busy signal.

Phase 7: the control unit UC2 instructs the marker MQ2 to connect V-2 to VOCC.

Phases 8 and 9: the called terminal receives the busy signal and hangs up.

Phase 10: the unit UC2 instructs the terminal unit UT2 to disconnect the terminal T2 (local disconnection).

Phase 11: the control unit UC2 instructs the marker MQ2 to disconnect the link B-2-VOCC.

We claim:

1. A digital switching network in an exchange having distributed control and a central switching network, for interconnecting selected terminal units from groups of terminal units each including a plurality of terminal units and each terminal unit including means for connecting to selected ones of a plurality of multiplex links, said central switching network comprising a single switching stage having a plurality of independent planes, each plane connecting to a plurality of said multiplex links wherein each multiplex link comprises inlet and outlet links for communicating in opposite directions between said terminal units and central switching network, each multiplex link being connected in common to all terminal units in a group of terminal units and to one of said planes, and each group of terminal units being coupled to all planes via respective multiplex links, each of said planes comprising a plurality of synchronized switches each equipped with a market, all switches in any given plane being connected in parallel to all inlet links coupled to said given plane and each switch being coupled to a respective group of the outlet links coupled to said given plane, each switch being modular and including a control memory circuit driven by the associated market and further including a plurality of square switching matrices, each of said square switching matrices in a given switch being coupled to a respective portion of the inlet links coupled to said given switch and to all outlet links coupled to said given switch, connection data stored in the control memory circuit of a given switch determining connections between inlet links and respective outlet links served by each switching matrix in said given switch, and said associated market of said given switch controlling said connection data stored in the control memory of said given switch.

2. A switching network according to claim 1 wherein each marker includes a microprocessor and wherein the control memory circuit comprises an addressing memory for the buffer memories of the switch, inlet registers and outlet registers giving access to a microprocessor data bus, said registers being selected by enabling signals obtained by decoding the signals sent out by the microprocessor on an address bus.

3. A switching network according to claim 1, further comprising in each switch, means for extracting samples from the inlet and outlet multiplex links and means for injecting samples of an active checking code, and further including the following means to check an adequate speech path in both directions from a calling terminal to a called terminal:

the said means for extracting a sample and for injecting a sample;

means for looping the send and receive paths at each of said terminals; and means for comparing a sample injected in one switch with the same sample as extracted at the inlet to the same switch after it has followed the entire path round the exchange via both looping connections at the terminals.

4. A switching network according to claim 1, wherein the terminal units are in groups each of which is associated with a control unit for controlling the group and the connections which link the group to the switching network, a call being set up between two terminals by said terminal units exchanging messages with the control units responsible for said terminal units and the markers of the switches chosen by the control units for establishing the conversation links between said terminals, wherein the links are looped and the test is performed by messages being exchanged over the links between a first control unit and the calling terminal unit between said first control unit and a marker of a first switch, between a second control unit and the terminal unit of the called party, between said second control unit and a marker of a second switch, and between said first and second control unit.

5. A switching network according to claim 1, wherein each of said square switching matrices is a square time matrix.

* * * * *